UNITED STATES PATENT OFFICE 2,550,321

AMINO DERIVATIVES AND PROCESS OF MAKING SAME

Franz Ackermann, Binningen, Switzerland, assignor to Ciba Limited, Basel, Switzerland No Drawing. Application November 16, 1948, Serial No. 60,400. In Switzerland December 12, 1947

11 Claims. (Cl. 260—304)

According to one feature of this invention new amino derivatives are made by substituting an —$SO_3H$ group or a $$-\overset{H}{\underset{R_1}{C}}-SO_3H$$

group ($R_1$=H, alkyl, aryl, or furfuryl) or a neutralized —$SO_3H$ group or a neutralized $$-\overset{H}{\underset{R_1}{C}}-SO_3H$$

group (wherein $R_1$ has the above indicated significance), in at least one amino group of amino compounds which contain the atom grouping

[ring structure with positions numbered 3,4,5,6,7,1 and $x$, with N at 3 and C— at 2]

$$\left(x = -\underset{H}{N}-, \quad \underset{alkyl}{N} \quad or \quad -S-\right)$$

and which also contain at least one primary or secondary amino group attached to a nucleus and which, when in the form of a solution, applied to a substratum, in particular cellulose, fluoresce blue to violet in ultraviolet light.

According to a further feature of this invention the new amino compounds are applied in industrial processes, in particular as optical bleaching agents.

Fiber materials are improved, in accordance with this feature, by applying thereto, at a suitable point of their process of manufacture or finishing, new amine derivatives as above set forth.

The new compounds have no dyestuff character but according to the constitution possess a more or less outstanding affinity for various substrata. On account of this property the products obtained according to the invention which in daylight or ultraviolet light have a blue to violet fluorescence, have such an improving effect on materials to which they are applied that in the case of undyed material the whiteness is enhanced and in the case of dyed material the dyeing becomes brighter. In the case of undyed originally yellowish material the increase of the whiteness is due to the fact that the blue to violet fluorescence of the compound applied causes the originally yellowish material to appear white.

By introduction of —$SO_3H$ or $$-\overset{H}{\underset{R_1}{C}}-SO_3H$$

groups and particularly of neutralized —$SO_3H$ or $$-\overset{H}{\underset{R_1}{C}}-SO_3H$$

groups into the amino groups of the starting materials in accordance with the process of the invention, the solubility in water is increased. In addition the fastness properties, in particular the fastness to light of the fibers treated with the end products of this process may experience an improvement.

The starting materials for the preparation of the new amine derivatives may be amino compounds of the general formula $$Ar\diagup\!\!\!\!\!\underset{x}{\overset{N}{\diagdown}}\!\!\!\!\!\diagdown C-Ar_1-\underset{H}{N}-R$$

wherein Ar stands for a divalent radical of the benzene series which may contain substituents, such as alkyl and halogen, $Ar_1$ stands for a divalent radical of the benzene series which may be substituted by a sulfonic acid group, and also by alkyl and halogen, $x$ stands for the atom grouping $$-\underset{H}{N}-, \quad -\underset{alkyl}{N}-$$

or —S—, and R stands for H or alkyl.

Especially suitable for the preparation of the new amine derivatives are amino compounds of the general formula $$Ar\diagup\!\!\!\!\!\underset{x}{\overset{N}{\diagdown}}\!\!\!\!\!\diagdown C-Ar_1-NH_2$$

wherein Ar stands for a divalent radical of the benzene series which may be substituted by at least one lower alkyl group in 6-position (the positions being numbered thus:

[ring structure with positions 3,4,5,6,7,1 and $x$, with N at 3 and C— at 2]

and wherein $Ar_1$ stands for a divalent radical of the benzene series which is substituted by at most one sulfonic acid group and $x$ stands for the atom grouping

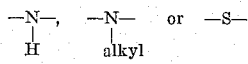

In the above formulae, $Ar_1$, can be, e. g. a paraphenylene radical which may contain as the only additional substituent a sulfonic acid radical. The radicals

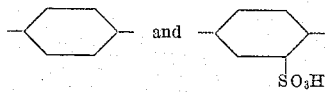

are examples therefor.

To these amino compounds belong, for example: 2-[4-amino-phenyl]-6-methyl-benzthiazole, 2-[4-amino-phenyl] - benzthiazole, 2-[4-methylamino - phenyl] - 6 - methyl - benzthiazole of the formula

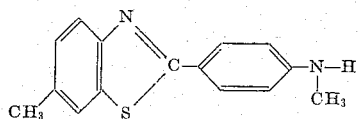

the sulfonic acid of the formula

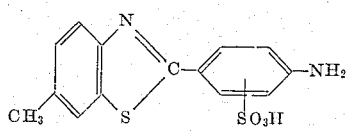

furthermore 2-[4-amino-phenyl] - 6 - methoxybenzthiazole, 2-[4 - amino - phenyl] - 6 - aminobenzimidazole, [2-4-amino-phenyl]-benzimidazole, 1-methyl-2-[4-amino-phenyl] - benzimidazole, 1-methyl-6 - methyl - 2-[4 - amino - phenyl] benzimidazole, as well as substitution products of the named amino compounds, the aromatic rings of which may also contain halogen atoms or additional alkyl radicals.

The introduction in accordance with the invention of the —SO$_3$H groups or the

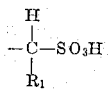

groups, or the neutralized —SO$_3$H groups or the neutralized

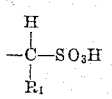

groups into the amino group of the starting materials can, for example, be effected in the following manner:

(a) Radicals of the formula

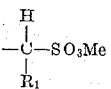

where $R_1$ stands for hydrogen, alkyl, aryl or furfuryl and Me for alkali, can be introduced into the amino group of the starting materials by treatment with water-soluble aldehyde-bisulfite compounds, such as are obtained, for example, from aqueous alkali bisulfite solutions and aldehydes. By treatment with formaldehyde bisulfite compounds, for example, by heating the specified amino compounds with an aqueous sodium formaldehyde bisulfite solution to 95–100° C., radicals of the formula MeO$_3$S—CH$_2$—, in which Me has the significance set forth above, can be introduced into the amino groups. Instead of formaldehyde bisulfite compounds, also bisulfite compounds of other aldehydes such as acetaldehyde, benzaldehyde or furfurol can be employed in similar manner.

(b) Radicals of the formula —SO$_3$H can be introduced into the amino groups of the starting materials by treatment with the addition product of sulfur trioxide or a halogen sulfonic acid, such as chlorosulfonic acid, with pyridine, advantageously in the presence of an excess of pyridine. These sulfonating agents may be designated as sulfonating agents which replace a hydrogen atom of an amino group by a —SO$_3$H group.

The water-solubility of the products of the invention is enhanced by the subsequent conversion of the sulfonic acid groups into their water-soluble salts, preferably alkali salts, ammonium salts or amine salts, unless such salts are directly obtained in the process of manufacture.

The introduction of —SO$_3$H or

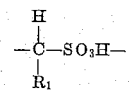

groups into the amino groups of the aforedescribed amino compounds leads to products which do not differ materially from each other with regard to the water-solubility or other properties of these compounds. Irrespective of which of the two groups is introduced, the resultant compounds are always anion active and owe the enhancement of their solubility in water to the same group of atoms, namely the —SO$_3$H group.

The products of the invention can be defined as water-soluble salts of amino derivatives of the general formula

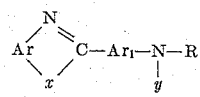

wherein Ar stands for a divalent radical of the benzene series which may carry alkyl radicals or halogen atoms, $Ar_1$ stands for a divalent radical of the benzene series which may contain a sulfonic acid group and also alkyl radicals or halogen atoms, $x$ stands for the atom grouping

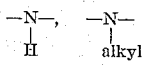

or —S—, hydrogen, or alkyl, and $y$ for the radical —SO$_3$H, —CH$_2$SO$_3$H,

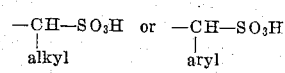

Examples of the products of the invention are those of the general formula

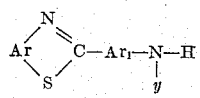

wherein Ar stands for a divalent phenylene radical which is at the most substituted by a 6-positioned alkyl group of low molecular weight, $Ar_1$ stands for a divalent radical of the benzene series, and $y$ for the radical —SO$_3$H, —CH$_2$SO$_3$H,

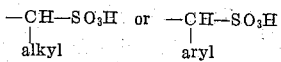

and their salts of alkalis, ammonia and amines. As used herein, the words "at the most substituted by a 6-positioned alkyl group" shall include both, unsubstituted phenyl radicals, and phenyl radicals which are substituted in the 6-position by an alkyl group.

Moreover, the present invention comprises the products of the general formula

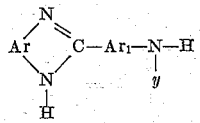

wherein Ar stands for a divalent phenylene radical which is substituted at the most by a 6-positioned alkyl group of low molecular weight, Ar₁ stands for a divalent radical of the benzene series which is substituted at the most by one sulfonic acid group, and $y$ for the radical —SO₃H, —CH₂—SO₃H,

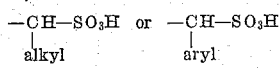

as well as their water-soluble salts of alkali, ammonia, or amines.

The application in industry of the new products obtainable in accordance with the invention can take place in such a manner that the materials to be improved are soaked in solutions, in particular, aqueous solutions of the specified compounds and after hydro-extracting or squeezing out are dried. For example, white goods, in particular, after a washing process carried out in the customary manner, can be after-treated with the products of this invention. Moreover, the new products, in particular such as are derived from 4:4'-diamino-stilbene-disulfonic acid-(2:2') can be employed for the after-treatment of printed cellulosic materials.

In general, formaldehyde bisulfite condensation products of the type mentioned above may be introduced into discharge printing pastes for cellulosic materials.

The compounds obtainable in accordance with the present process can also be employed in the course of the manufacturing process of the materials to be improved, for example, by adding them to a paper pulp.

In general, small quantities of the products obtainable according to the invention suffice in order to attain an improvement of the materials.

The compounds obtainable according to the present process can also be employed in admixture with auxiliary agents such as are employed for the improvement of fibrous materials, for example, together with washing agents (for example, in conjunction with soaps, salts of sulfonated washing agents, as for example, sulfonated benzimidazoles substituted on the 2-carbon atom by higher alkyl radicals, or also of mono-carboxylic esters of 4-sulfophthalic acid with higher fatty alcohols or together with fatty alcohol sulfonates or condensation products of higher fatty acids with aliphatic hydroxy- or amino-sulfonic acids). In this manner the materials to be improved can be simultaneously washed and bleached. A particularly noticeable brightening is obtained when undyed vegetable fibers, in particular cotton, are treated with such mixtures containing washing agents.

As materials which can be improved according to this process may be mentioned, for example the following:

Nitrogenous natural and artificial materials such as wool, silk or synthetic polyamide fibers; also cellulosic materials such as cellulose, paper, textile materials of cotton, linen, regenerated cellulose including staple fibers of regenerated cellulose; and finally synthetic materials such, for example, as are produced by polymerization. The best effects by the application of the present process are, however, obtained on vegetable fibers. The material to be improved can be employed in any desired form, for example, in fiber form or also in the form of film. The material can, for example, be undyed, dyed or printed.

The following examples illustrate the invention, the parts and percentages being by weight unless otherwise stated and the relationship of parts by weight to parts by volume being the same as that of the kilogram to the liter:

*Example 1*

From 52 parts of 40 per cent. sodium bisulfite solution and 16.2 parts of aqueous 37 per cent. formaldehyde solution a formaldehyde bisulfite solution is prepared which is rendered weakly alkaline with sodium carbonate. To this are added 4 parts of 2-[4-aminophenyl]-6-methyl-benzthiazole and the whole is boiled under reflux for 4–6 hours. It is allowed to cool, treated to complete separation with sodium chloride, filtered and the residue washed with a solution of sodium chloride and dried.

The resultant compound of the formula

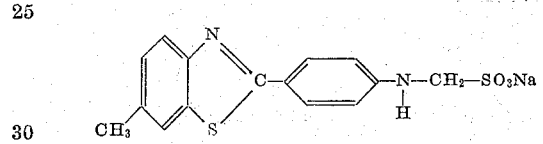

is a yellowish powder which is soluble in water. The solution in ultraviolet light fluoresces blue violet. If in lieu of the formaldehyde bisulfite solution a corresponding quantity of an acetaldehyde-bisulfite solution is used, the compound of the formula

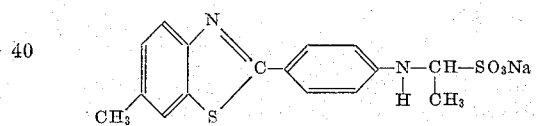

is obtained the properties of which are very similar.

*Example 2*

To 50 parts of pyridine at a temperature below 40° C. are added 10 parts of chlorsulfonic acid and then 3 parts of 2-[4-aminophenyl]-6-methyl-benzthiazole. The temperature is raised to 90° C. and maintained at 90–95° C. until a test portion has become soluble in dilute sodium carbonate solution. Thereupon the whole is allowed to cool, poured into ice water, neutralized with sodium carbonate and the condensation product separated with salting out agents, for example with sodium chloride. The new compound of the formula

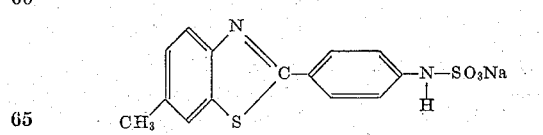

is filtered off, washed with aqueous sodium chloride solution and dried. A light colored powder is obtained which is soluble in water. When the solution is applied to white paper this, on exposure to ultraviolet light, assumes a bluish fluorescence.

If in lieu of 2-[4-amino-phenyl]-6-methyl-benzthiazole a corresponding quantity of 2-[4-methyl-aminophenyl]-6-methyl-benzthiazole is used as starting material, the compound of the formula

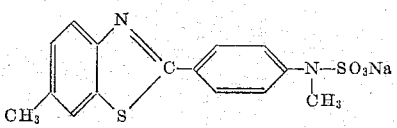

is obtained which has very similar properties.

*Example 3*

A benzaldehyde bisulfite solution is produced from 52 parts of 40 per cent. sodium bisulfite solution, 21.2 parts of benzaldehyde and 50 parts of water and this solution is rendered weakly alkaline with aqueous sodium carbonate solution. To it are added 6 parts of ammonium salt of 2 - [4 - aminophenyl] - 6 - methyl - benzthiazole monosulfonic acid, obtained by sulfonation of 2 - [4 - aminophenyl] - 6 - methyl - benzthiazole with fuming sulfuric acid containing 10 per cent. of sulfur trioxide at 20–25° C. The whole is boiled under reflux until all the starting material has disappeared. After cooling the new product of the formula

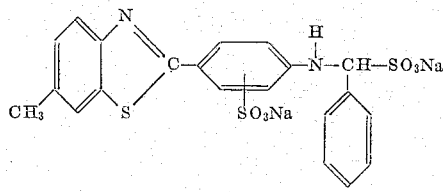

is separated with salting out agents, for example with sodium chloride, filtered, the residue washed with a sodium chloride solution and dried. A light yellow powder is obtained which is soluble in water. The solution has a violet blue fluorescence.

*Example 4*

A furfurol bisulfite solution is prepared from 26 parts of 40 per cent. sodium bisulfite solution and 9.6 parts of furfurol. The solution is rendered weakly alkaline with sodium carbonate, 3 parts of 2-[4-aminophenyl]-6-methyl-benzthiazole added and the whole boiled under reflux until the starting material has disappeared and complete solution has taken place. The solution is allowed to cool, treated to complete separation with salting out agents, for example sodium chloride, filtered and the residue washed with aqueous sodium chloride solution and dried. The resultant product is a yellowish powder of the formula

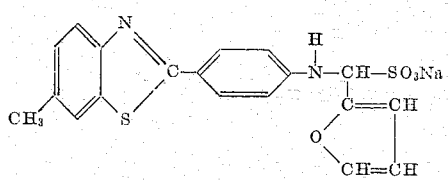

and is soluble in water. When the solution is applied to white paper the latter, when exposed to ultraviolet rays, assumes a bluish fluorescence.

*Example 5*

To a weakly alkaline formaldehyde bisulfite solution produced from 52 parts of 40 per cent. sodium bisulfite solution and 16.2 parts of 37 per cent. aqueous formaldehyde solution are added 4 parts of 2-[4-aminophenyl]-benzimidazole and the whole boiled under reflux until the starting material has disappeared. The product is filtered, the filtrate allowed to cool and the separated condensation product of the formula

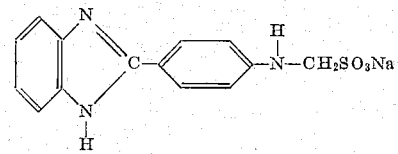

filtered off, washed with aqueous sodium chloride solution and dried. The colorless powder obtained is soluble in water. The solution in ultra-violet light has a violet-blue fluorescence.

If in lieu of 2-[4-aminophenyl]-benzimidazole a corresponding quantity of 1-methyl-2-[4-aminophenyl]-benzimidazole is used as starting material, the compound of the formula

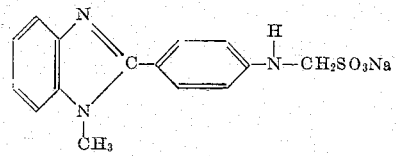

is obtained which has very similar properties.

*Example 6*

From 26 parts of a sodium bisulfite solution of 40 per cent. strength by weight and 8.1 parts of formaldehyde solution of 37 per cent. strength by weight, a formaldehyde bisulfite solution is prepared and rendered weakly alkaline with sodium carbonate. 3 parts of 2-[4-aminophenyl]-benzthiazole are added and the reaction mass refluxed until the starting material has disappeared. After cooling, sodium chloride is added to effect complete separation of the product, which is then filtered and the residue washed with an aqueous solution of sodium chloride and dried.

The resultant compound of the formula

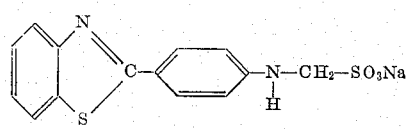

is a yellowish, water-soluble powder. Its solution shows a blue-violet fluorescence when exposed to ultra-violet light.

If in lieu of 2-[4-aminophenyl]-benzthiazole a corresponding quantity of 2-[4-aminophenyl]-6-methoxybenzthiazole is used as starting material the compound of the formula

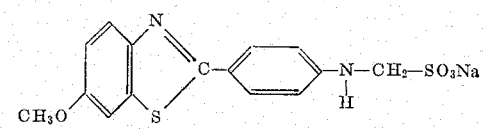

is obtained which has very similar properties.

*Example 7*

A formaldehyde bisulfite solution is prepared as described in Example 6. 4 parts of 2-[4-aminophenyl]-6-amino-benzimidazole are added and the whole refluxed for 2 hours and then evaporated to dryness at 50–80° C. The compound of the formula

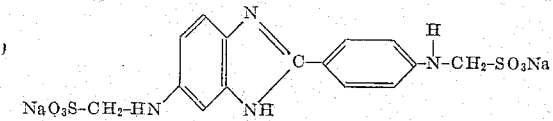

is thus obtained which is a pale powder. It is very readily soluble in water. Its aqueous solution shows a bluish fluorescence when exposed to ultra-violet light.

Example 8

Natural silk in a bath ratio of 1:40 is treated at room temperature in a bath containing per liter 0.01–0.03 gram of the product produced according to Example 1 and 1 gram of 40 per cent. acetic acid. The material is subsequently rinsed and dried.

The silk has a higher degree of whiteness than the untreated material.

Example 9

10 grams of acetate artificial silk are treated for half an hour at 40–45° C. in a bath consisting of a solution of 0.01 gram of the product obtained according to Example 1 in 400 cc. of water. Rinsing and drying follows. The silk possesses a whiter appearance than the untreated material.

What I claim is:

1. A process for the manufacture of a water-soluble amine derivative which comprises condensing an amino compound of the general formula

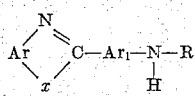

wherein Ar is a divalent phenylene radical, at the most substituted by one lower alkyl group in the 6-position, Ar₁ is a divalent radical of the benzene series, $x$ is a member selected from the group consisting of $$-\underset{H}{N}-,\ -\underset{alkyl}{N}-$$

and —S— and R is a member selected from the group consisting of H and alkyl, with a water-soluble aldehyde-bisulfite compound, at a temperature of 90–100° C. in a weakly alkaline aqueous medium.

2. A process for the manufacture of a water-soluble amine derivative, which comprises condensing an amino compound of the general formula

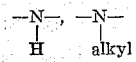

wherein Ar is a divalent phenylene radical, at the most substituted by one lower alkyl group in the 6-position, and Ar₁ is a p-phenylene radical, substituted by at the most one sulfonic acid group, with a water-soluble aldehyde-bisulfite compound, at a temperature of 90–100° C. in a weakly alkaline aqueous medium.

3. A process for the manufacture of a water-soluble amine derivative, which comprises condensing the amino compound of the formula

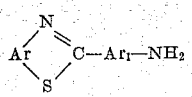

with a water-soluble aldehyde-bisulfite compound, at a temperature of 90–100° C. in a weakly alkaline aqueous medium.

4. A process for the manufacture of a water-soluble salt of the amino derivative of the formula

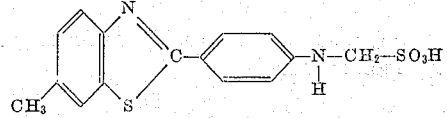

which comprises condensing the amino compound of the formula

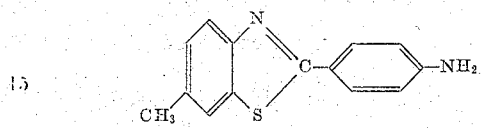

with a water-soluble formaldehyde-bisulfite compound, at a temperature of 90–100° C. in a weakly alkaline aqueous medium.

5. A process for the manufacture of a water-soluble derivative of an amine, which comprises condensing an amino compound of the general formula

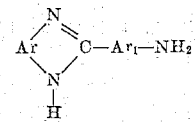

wherein Ar is a divalent phenylene radical, at the most substituted by one lower alkyl group in the 6-position, and Ar₁ is a divalent radical of the benzene series, at the most substituted by one sulfonic acid group, with a water-soluble aldehyde-bisulfite compound, at a temperature of 90–100° C. in a weakly alkaline aqueous medium.

6. A process for the manufacture of a water-soluble salt of the amino derivative of the formula

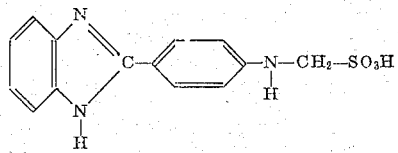

which comprises reacting the amino compound of the formula

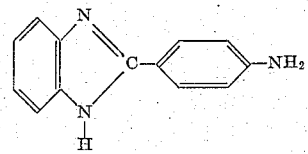

with a water soluble formaldehyde-bisulfite compound, at a temperature of 90–100° C. in a weakly alkaline aqueous medium.

7. A water-soluble salt of an amino derivative of the general formula

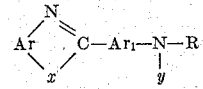

wherein Ar is a divalent phenylene radical, at the most substituted by one lower alkyl group in the 6-position, Ar₁ is a divalent radical of the benzene series, R is a member selected from the group consisting of H and alkyl, $x$ is a member selected from the group consisting of

and —S—, and $y$ is a member selected from the group consisting of

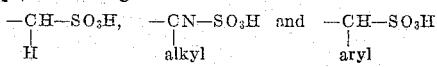

8. A water-soluble salt of an amino derivative of the general formula

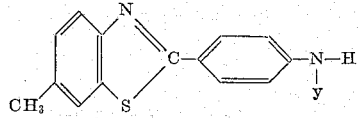

wherein $y$ is a member selected from the group consisting of

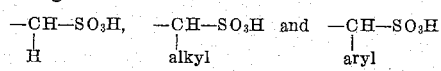

9. A water-soluble salt of the amino derivative of the formula

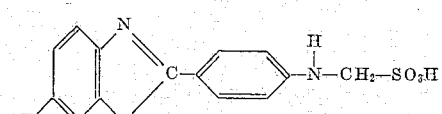

10. A water-soluble salt of an amino derivative of the general formula

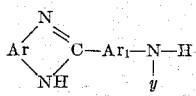

wherein Ar is a divalent phenylene radical, at the most substituted by one lower alkyl group in the 6-position, $Ar_1$ is a divalent radical of the benzene series substituted by at most one sulfonic acid, and $y$ is a member selected from the group consisting of

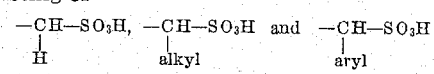

11. A water-soluble salt of the amino derivative of the formula

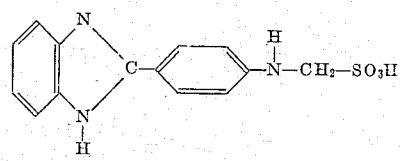

FRANZ ACKERMANN.

REFERENCES CITED

The following references are of record in the file of this patent:

UNITED STATES PATENTS

| Number | Name | Date |
|---|---|---|
| 1,149,582 | Huismann | Aug. 10, 1915 |

FOREIGN PATENTS

| Number | Country | Date |
|---|---|---|
| 5,853 | Great Britain | 1894 |
| 6,644 | Great Britain | 1914 |